(12) United States Patent
Lemay et al.

(10) Patent No.: US 10,318,733 B2
(45) Date of Patent: *Jun. 11, 2019

(54) TECHNIQUES FOR DETECTING MALWARE WITH MINIMAL PERFORMANCE DEGRADATION

(71) Applicant: INTEL CORPORATION, Santa Clara, CA (US)

(72) Inventors: Michael Lemay, Hillsboro, OR (US); David M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,469

(22) Filed: Nov. 13, 2017

(65) Prior Publication Data
US 2018/0129808 A1    May 10, 2018

Related U.S. Application Data

(63) Continuation of application No. 14/757,945, filed on Dec. 24, 2015, now Pat. No. 9,817,976.

(51) Int. Cl.
*G06F 12/14* (2006.01)
*G06F 21/56* (2013.01)
*H04L 29/06* (2006.01)

(52) U.S. Cl.
CPC .......... *G06F 21/566* (2013.01); *G06F 21/567* (2013.01); *H04L 63/145* (2013.01); *H04L 63/1416* (2013.01); *G06F 2221/032* (2013.01)

(58) Field of Classification Search
None
See application file for complete search history.

(56) References Cited

U.S. PATENT DOCUMENTS

| | | | |
|---|---|---|---|
| 2013/0124798 A1* | 5/2013 | Aszmann | G06F 3/0689 711/114 |
| 2014/0181975 A1* | 6/2014 | Spernow | G06F 21/562 726/23 |

* cited by examiner

*Primary Examiner* — Brandon S Hoffman

(57) ABSTRACT

Various embodiments are generally directed to techniques for detecting malware in a manner that mitigates the consumption of processing and/or storage resources of a processing device. An apparatus may include a first processor component of a processing device to generate entries in a chronological order within a first page modification log maintained within a first storage divided into multiple pages, each entry to indicate a write access made by the first processor component to a page of the multiple pages; a retrieval component of a graphics controller of the processing device to recurringly retrieve indications from the first page modification log of at least one recently written page of the multiple pages; and a scan component of the graphics controller to recurringly scan the at least one recently written page to detect malware within the at least one recently written page.

25 Claims, 10 Drawing Sheets

500

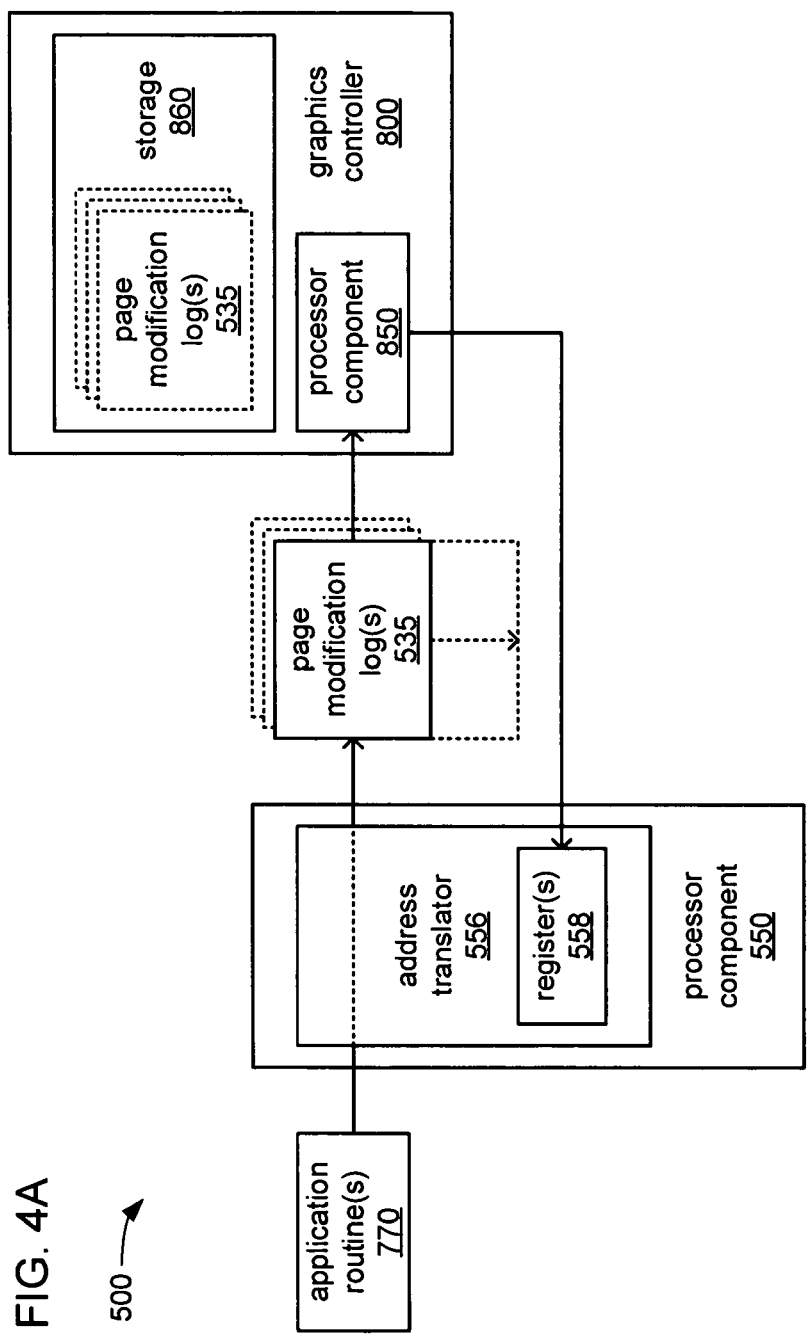

TECHNIQUES FOR DETECTING MALWARE WITH MINIMAL PERFORMANCE DEGRADATION

CROSS-REFERENCE TO RELATED APPLICATIONS

This application is a continuation of, claims the benefit of, and claims priority to U.S. patent application Ser. No. 14/757,945 filed on Dec. 24, 2015, and now issued as U.S. Pat. No. 9,817,976, the subject matter of which is incorporated herein by reference in its entirety.

BACKGROUND

As ever more sophisticated techniques are employed to enable malware to evade detection by security routines employed to detect malware, the techniques required to detect malware must consume ever greater processing and/or storage resources. As a result, an increasing proportion of processing and/or storage resources of processing devices must be diverted to detect malware and away from performing the functions for which those processing devices were originally acquired.

By way of example, commonplace pieces of malware increasingly make use of various byte packing techniques, including data compression techniques, to make it harder for security routines to identify those pieces of malware through use of known signatures, such as particular combinations of instructions that may be unique to pieces of malware. To make use of known signatures with packed pieces of malware, unpacking of those pieces of malware must first be performed, which may consume much of the available processing and/or storage resources of a processing device.

BRIEF DESCRIPTION OF THE DRAWINGS

FIGS. 4A, 4B and 4C each illustrate an example embodiment of recurringly accessing at least one page modification log to identify recently written to pages.

DETAILED DESCRIPTION

Figure 1:
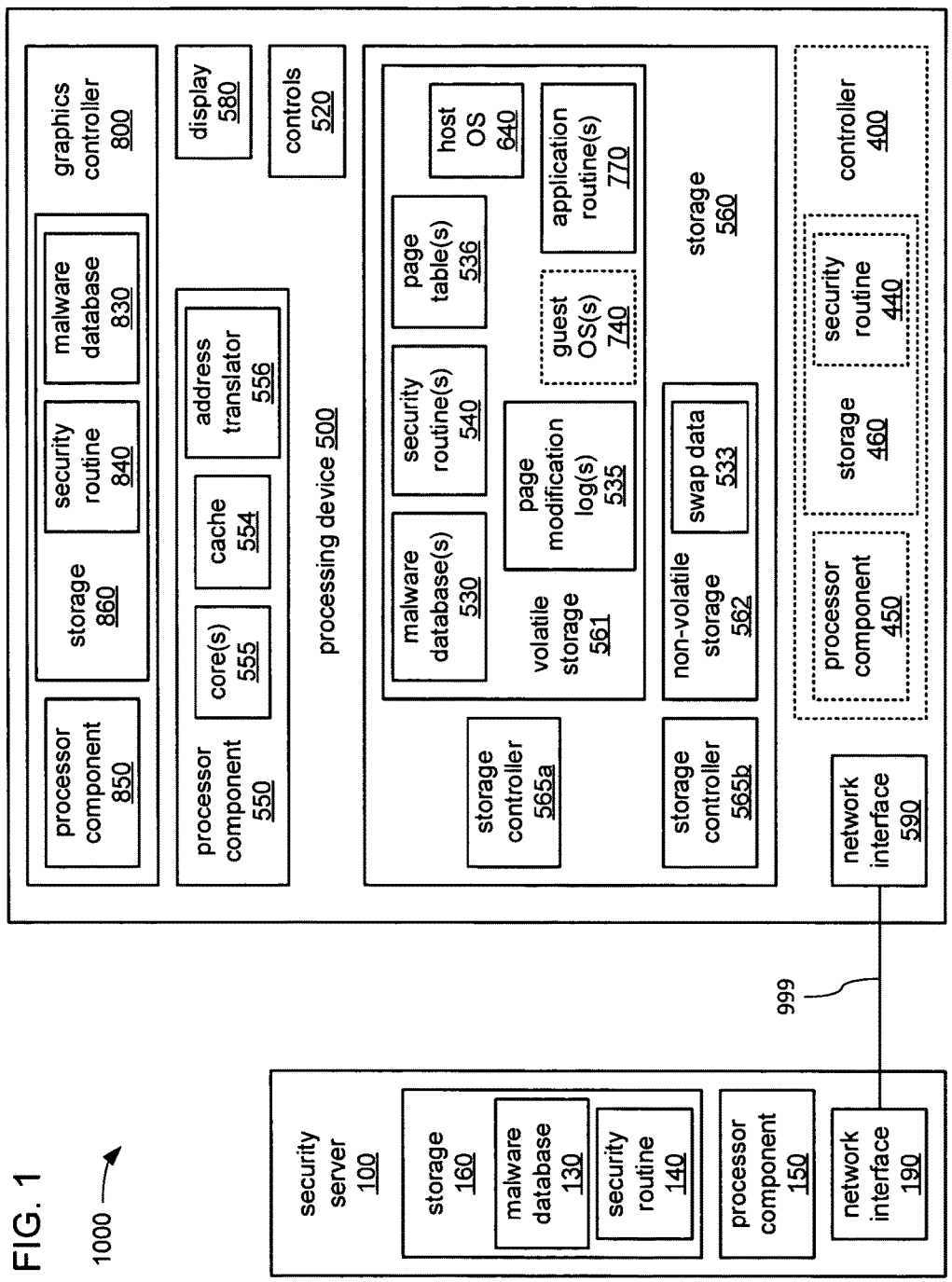
FIG. 1 illustrates an example embodiment of a secure processing system.

Various embodiments are generally directed to techniques for detecting malware in a manner that mitigates the consumption of processing and/or storage resources of a processing device. As a main processor component of a processing device is caused by the execution of instructions to write to portions of a storage of the processing device that have been allocated as pages, the main processor component may engage in page modification logging (PML) in which the processor component may add indications of which of those pages have recently been written to in one or more page modification logs. Alternatively, as those pages are written to by the main processor component and/or other processor components, a storage controller through which those pages are accessed may add such indications to one or more page modification logs. As the one or more page modification logs are generated, a graphics processor component of a graphics controller may recurringly access the one or more page modification logs to identify ones of the pages that have been recently written to. The graphics processor component may then perform scans of those recently written pages to detect malware. Upon detecting malware within one or more pages, the graphics processor component may provide an indication of those pages having malware detected therein to a security routine executed by the main processor component and/or another processor component within the processing device, and/or a processor component of a security server to enable further action to be taken.

In various embodiments, the number of page modification logs may vary based on such factors as the quantity of processor components, the quantity of cores per processor component, the quantity of threads of execution supported by each core of each processor component, whether virtual machines (VMs) are instantiated within the processing device, the quantity VMs instantiated, the quantity of operating systems (OSs) and/or application routines executed, etc. More specifically, in some embodiments, there may be a single page modification log, regardless of how many cores, threads of execution, VMs, OSs and/or application routines there may be. However, under particular circumstances, either the single page modification log may be increased in size or additional page modification log(s) may be instantiated. In other embodiments in which the main processor component incorporates multiple cores and/or supports multiple threads of execution in supporting multiple VMs, there may be one page modification log per core, per thread of execution, per VM, per OS and/or per application routine.

In some embodiments, an address translator of the main processor component may define the locations of each page modification log within the storage, and may generate the entries within each page modification log based on translations of virtual addresses to physical addresses performed by the address translator in support of write operations into pages at address locations originally specified by the virtual addresses. Where multiple VMs are supported by the main processor component, the address translator may define the locations of separate page modification log(s) for each VM, and may generate entries within different ones of those page modification logs based on translations of virtual addresses to physical and/or machine addresses in support of write operations into pages at address locations associated with different ones of the VMs. However, in other embodiments, a storage controller coupled to the storage of which portions have been allocated as pages may track write operations thereto and may generate the entries within one or more page modification logs. In some embodiments, the storage controller may maintain a single page modification log and may generate entries therein regardless of whether it is the main processor component, another processor component or still another type of component of the processing device that performs a write operation into a page. In other embodiments, the storage controller may maintain separate page modification logs that are each associated with a different processor component and/or different other type of component of the processing device that may perform a write operation into a page.

In some embodiments, the granularity of storage space associated with the entries of the page modification log(s) may be identical to that associated with the entries of page table(s) that are walked by the address translator. By way of example, where various features of the architecture of the processing device may be selected and/or configured to conform to aspects of the IA-32 architecture promulgated by Intel Corporation of Santa Clara, Calif., each page may be four kilobytes in size and entries within page tables and within each page modification log may be associated with single four kilobyte pages. However, in other embodiments, the granularity of storage space associated with entries of the page modification log(s) may be a finer granularity than that associated with the entries of the page table(s). By way of example, where entries within page tables may be associated with a single four kilobyte page, each entry within each page modification log may be associated with only a portion of a four kilobyte page, and the size of such a portion may be selected to match the quantity of bytes within a cache line of the cache of the main processor component (e.g., 32 bytes, 64 bytes, etc.).

In some embodiments, the processing device may incorporate a graphics controller to generate imagery for presentation on a display associated with the processing device. The graphics controller may incorporate a graphics processor component to perform complex graphics operations, including and not limited to, decompressing and/or decrypting motion video, rendering two-dimensional (2D) images of objects of a three-dimensional (3D) model from a selected perspective, etc. Indeed, the graphics processor component may be capable of implementing and/or supporting a graphics pipeline within the graphics controller in which there is considerable capability to perform parallel and/or vector-based mathematic and/or logical operations such that at least the graphics processor component is well suited to performing pattern matching. In such embodiments, the graphics processor component may have access to the storage and may use that access to recurringly check the one or more page modification logs to identify pages (or portions of pages) that have recently been written to. The graphics processor component may then employ a malware database of signatures and its pattern matching capabilities to scan each of those recently written pages (or portions of pages) for pieces of malware. The graphics processor component may engage in the performance of such scans during periods of time in which it is not occupied with the performance of graphics operations to such an extent that it is not practicably able to perform such scans. Thus, the performance of such scans may be on an opportunistic basis. Regardless of when or how continuously the graphics processor component is able to perform such scans, such use of the graphics processor component to perform such scans in lieu of using the main processor component to do so may serve to both reduce the consumption of processing resources of the main processor component to perform such scans and improve the trustworthiness of the performance of such scans by having such scans performed by a processor component other than the main processor component.

In various embodiments, the one or more page modification logs may serve as an input to one or more address translation and/or page management oversight functions, such as enabling the monitoring of various aspects of performance and/or serving as a trigger to synchronize the contents of various page tables maintained by the address translator. Such other function(s) may consume the information contained within the one or more page modification logs at a different rate than the graphics processor component, and this may cause various forms of contention over when each of the one or more page modification logs may be cleared and/or otherwise modified in a manner that may deprive the graphics processor component of at least some of the indications therein of pages (or portions of pages) written to. In some embodiments, the graphics processor component may be allowed to provide a request that the size of the one or more page modification logs be increased and/or that additional page modification logs be created and maintained to at least delay the clearing of a page modification log. In other embodiments, the graphics processor component may create copies of the contents of the one or more page modification logs before they are cleared, and may then check the copies to identify pages (or portions of pages) that have recently been written to.

Regardless of the exact manner in which the graphics processor component may access and/or maintain access to the contents of the one or more page modification logs, upon detecting a piece of malware in one of its scans of a recently written page (or portion of a page), the graphics processor component may take any of a variety of actions to at least mitigate the consequences of the presence of that malware. In some embodiments, the graphics processor component may provide an indication to a security routine executed by the main processor component to enable action to be taken to remove and/or otherwise thwart whatever malicious actions may be taken by that malware. Where there are VMs, that security routine may be executed by the main processor component within an operating environment provided by a guest OS within one of the VMs.

In other embodiments, the processing device may include a controller that incorporates a separate controller processor component to execute another security routine, and the graphics processor component may provide an indication of having detected the malware to the controller processor component to enable the controller processor component to take action to at least mitigate the consequences of the presence of the malware. It may be that the graphics processor component has determined, based on the addresses of the page tables (or the portions of page tables) in which the malware was detected, that the integrity of the host OS and/or a guest OS is sufficiently compromised that no security routine executed by the main processor component is able to sufficiently address the situation. Thus, the actions taken by the controller processor component may include causing a reinitialization of the processing device to thereby cause a clearing of the storage in an effort to purge the malware, operating a network interface of the processing device to disconnect the processing device from a network to prevent spread of the malware to other processing devices, and/or operating the network interface to transmit an indication of the detection of the malware to a security server to enable the security server to take action. Such action by the security server may be to signal a router and/or other network device to disconnect the processing device from the network, and/or to signal other processing devices coupled to the network to cease all communications with the processing device.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a secure processing system 1000 incorporating a security server 100 and/or a processing device 500. The security server 100 and the processing device 500 may exchange data associated with scanning for and/or detecting malware within the processing device 500. As will be explained in greater detail, scans for malware are recurringly performed within the processing device 500 in a manner that minimizes the consumption of processing and/or storage resources employed in performing other functions, and at least indications of results of those scans may be transmitted by the processing device 500 to the security server 100 to at least enable the security server 100 to determine what action is to be taken in response. However, one or both of these devices may exchange other data entirely unrelated to scanning for and/or detecting malware with each other and/or with still other devices (not shown) via the network 999.

In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the security server 100 may incorporate a processor component 150, a storage 160 and/or a network interface 190 to couple the security server 100 to the network 999. The storage 160 may store a security routine 140 and/or malware database 130. The security routine 140 may incorporate a sequence of instructions operative on the processor component 150 to implement logic to perform various functions. As will be explained in greater detail, the processor component 150 may be caused by its execution of at least the security routine 140 to at least receive indications of whether malware has or has not been detected within the processing device 500. In response to receiving an indication that malware has been so detected, the processor component 150 may take any of a variety of actions, including and not limited to, transmitting commands to one or more other devices (not shown) coupled to the network 999 to refrain from communicating with the processing device 500 and/or to take action to disconnect the processing device 500 from the network 999.

In some embodiments, such an indication of malware having been detected may include a copy of at least a portion of the malware that has been so detected. In such embodiments, the malware database 130 may be made up of numerous signatures of known pieces of malware (e.g., sets of executable instructions known to be present within known pieces of malware). The processor component 150 may be caused by its execution of the security routine 140 to compare what is received of the malware detected within the processing device 500 to signature of known pieces of malware in the malware database 130 to identify the malware. Alternatively or additionally, the received indication of malware having been detected may include an identifier of the malware. The malware database 130 may alternatively or additionally include evaluations of the level of threat of various known pieces of malware, and the processor component 150 may refer to the malware database 130 to determine the level of threat of that particular malware that has been detected, and may base the determination of what action to take on that level of threat.

In various embodiments, the processing device 500 may incorporate a processor component 550, a storage 560, manually-operable controls 520, a display 580 and/or a network interface 590 to couple the processing device 500 to the network 999. The processor component 550 may incorporate a cache 554, one or more processor cores 555 and/or an address translator 556. The storage 560 may incorporate volatile storage 561, non-volatile storage 562 and/or storage controllers 565a-b. The processing device 500 may also incorporate a controller 400 that may incorporate a processor component 450 and/or a storage 460. The processing device 500 may further incorporate a graphics controller 800 that may incorporate a processor component 850 and/or a storage 860.

The volatile storage 561 may be made up of one or more storage devices that are volatile inasmuch as they require the continuous provision of electric power to retain information stored therein. Operation of the storage device(s) of the volatile storage 561 may be controlled by the storage controller 565a, which may receive commands from the processor component 550 and/or other components of the processing device 500 to store and/or retrieve information therein, and may convert those commands between the bus protocols and/or timings by which they are received and other bus protocols and/or timings by which the storage device(s) of the volatile storage 561 are coupled to the storage controller 565*a*. By way of example, the one or more storage devices of the volatile storage 561 may be made up of dynamic random access memory (DRAM) devices coupled to the storage controller 565*a* via an interface in which row and column addresses, along with byte enable signals, are employed to select storage locations, while the commands received by the storage controller 565*a* may be conveyed thereto along one or more pairs of digital serial transmission lines.

The non-volatile storage 562 may be made up of one or more storage devices that are non-volatile inasmuch as they are able to retain information stored therein without the continuous provision of electric power. Operation of the storage device(s) of the non-volatile storage 562 may be controlled by the storage controller 565*b*, which may receive commands from the processor component 550 and/or other components of the processing device 500 to store and/or retrieve information therein, and may convert those commands between the bus protocols and/or timings by which they are received and other bus protocols and/or timings by which the storage device(s) of the non-volatile storage 562 are coupled to the storage controller 565*b*. By way of example, the one or more storage devices of the non-volatile storage 562 may be made up of ferromagnetic disk-based drives (hard drives) coupled to the storage controller 565*b* via a digital serial in interface in which portions of the storage space within each such storage device are addressed by tracks and sectors. In contrast, the commands received by the storage controller 565*b* may be conveyed thereto along one or more pairs of digital serial transmission lines conveying read and write commands in which those same portions of the storage space within each such storage device are addressed by block numbers.

The volatile storage 561 may store one or more instances of a malware database 530, one or more instances of a security routine 540, a host operating system (OS) 640, one or more guest operating systems 740, and/or one or more application routines 770. As the processor component 550 executes instructions of the host OS 640 and/or of the guest OS(s) 740 to provide one or more operating environments in which the one or more application routines 770 may be executed, the processor component 550, the host OS 640 and/or the guest OS(s) 740 may cooperate to divide the storage space within the volatile storage 561 into numerous pages and to provide virtual addressing. As familiar to those skilled in the art of virtual addressing, pages containing portions of data and/or portions of executable routines may be swapped between the storage space within the volatile storage and a swap data 533 maintained within the non-volatile storage 562 based on which pages contain portions of data and/or portions of executable routines that have been accessed more recently. As part of providing such support, the processor component 550 may generate and maintain one or more page tables 536 within a portion of the volatile storage 561 for use in converting between virtual and physical addresses, and/or one or more page modification logs 535 within a portion of the volatile storage 561 for use in tracking recent accesses to pages currently within the volatile storage 561. Though not specifically shown for sake avoiding visual clutter, copies of each of the host OS 640, the guest OS(s) 740 and/or the application routine(s) 770 may also be stored within the non-volatile storage 562 alongside the swap data 533 in preparation for being loaded into the volatile storage 561 at least during initialization of the processing device 500.

The processor component 550 incorporates at least one processor core 555 to execute instructions of an executable routine in at least one thread of execution. However, the processor component 550 may incorporate more than one of the processor cores 555 and/or may employ other processing architecture techniques to support multiple threads of execution by which the instructions of more than one executable routine may be executed in parallel. The cache 554 may be a multilayer set of caches that may include separate first level (L1) caches for each processor core 555 and/or a larger second level (L2) cache for multiple ones of the processor cores 555. The address translator 556 may provide support for the use of virtual addressing, and therefore, it may be the address translator 556 that employs the one or more page tables 536 for use in translating between virtual and physical addresses. In so doing, it may also be the address translator 556 that generates entries within the one or more page modification logs 535 as part of tracking recent accesses to pages currently within the volatile storage 561.

Figure 2A:
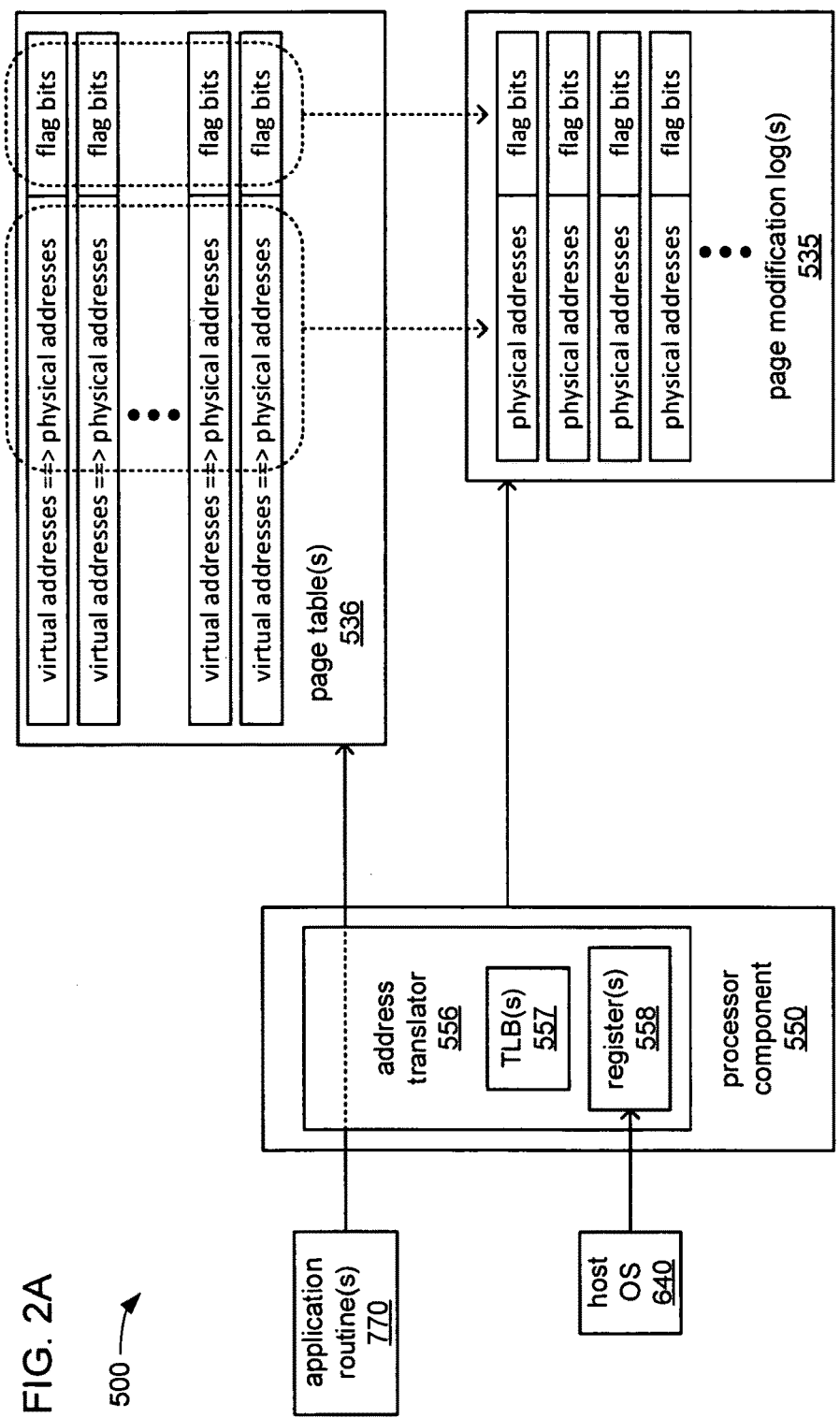
FIGS. 2A and 2B each illustrate an example embodiment of generating and maintaining at least one page modification log.

FIG. 2A illustrates in greater detail an example of the use of the page table(s) 536 and/or the page modification log(s) 535 where no VMs are provided and only a single OS is executed. In various embodiments, and as depicted, the host OS 640 and the address translator 556 may cooperate in various ways to generate one or more page tables 536 and/or one or more page modification logs 535. More specifically, in some embodiments, the host OS 640 may generate one or more of the page tables 536 within the volatile storage 561, and may then provide the base address(es) of the one or more page tables 536 to the address translator 556 via the depicted one or more registers 558 incorporated into the address translator 556, or by another mechanism to communicate with the address translator 556. Alternatively, in other embodiments, the host OS 640 may request that the address translator 556 generate the one or more page tables 536, itself. One of such mechanisms may also be used to generate the one or more page modification logs 535.

As familiar to those skilled in the art of using page tables to perform address translation, each of the one or more page tables 536 may be structured in any of a variety of ways to enable address translation to be performed relatively efficiently. By way of example in a relatively simple implementation, there may be a single page table made up of entries that each correlate a virtual address of a page to a corresponding physical address, and the virtual addresses may be ordered therein to accommodate whatever mechanism may be used to locate the correct entry. Implementing such a single page table may entail employing at least a portion of the bits of the virtual address as an index to entries within the single page table at which corresponding physical addresses may be stored. However, by way of another example in a more complex implementation, each one of what is commonly referred to as "a page table" may actually be made up of a tree of smaller page tables where the structure of the tree has layers of branching from lesser to greater quantities of such smaller tables. The bits making up the virtual addresses may be divided into subsets of bits that may each be used as an index into such smaller tables at a different branching layer. In translating a virtual address, the address translator 556 may start at the base of this tree-like structure, and may use each of the subsets of bits of the virtual address (starting with the subset that includes the most significant bits that are used) to sequentially determine each portion of a path through each successive branch in the tree-like structure to arrive at an entry within one of the smaller tables at an endpoint of a branch where a corresponding physical address may be found. This may be referred to as "walking" such through such page tables.

As depicted, where the host OS 640 cooperates with the processor component 550 to employ virtual addressing, an application routine 770 executed within an operating environment provided by the host OS 640 (or the host OS 640, itself) may perform a read or write access to a storage location (e.g., the location of a byte, word, doubleword, quadword, etc.) within a page within the volatile storage 561 while referring to that storage location with a virtual address. That virtual address may be provided to the address translator 556, which may walk the page table(s) 536 to reach an entry which correlates that virtual address to a corresponding physical address. As also depicted, each such entry may include one or more flag bits that may be set and/or reset to provide various indications of status for each page. Among those flag bits may be a "dirty" bit that provides an indication that at least one byte of storage space within a corresponding page within the volatile storage 561 has been written to since the last occasion on which such flag bits so associated with that page were cleared. Thus, upon locating that entry, the dirty bit among the flag bits of that entry may be set to indicate that at least one byte of that page has been written to if the access made by that application routine 770 (or by the host OS 640, itself) is a write access.

As additionally depicted, each of the page modification logs 535 may be made up of numerous entries in which a range of physical addresses (or other identifier) of a page may be stored. In some embodiments, an entry may be added to a page modification log 535 as a result of at least a byte being written to a page such that the presence of an entry indicates a write access was made. In other embodiments, an entry may also be generated within a page modification log 535 to record one or more other events affecting a page other than the writing of at least a byte thereto. To provide an indication of the type of event that resulted in the generation of each entry in the page modification log(s) 535 in such other embodiments, each entry of the page modification log(s) 535 may include flag bits that may be similar to those within the aforedescribed entries of the page table(s) 536, including corresponding dirty bits. The generation of entries within the page modification log(s) 535 may be caused and/or otherwise associated with the use of the page table(s) 536 to translate addresses for write accesses to pages. Thus, if an application routine 770 (or the host OS 640, itself) performs a write access to at least a byte within a page, then in addition to setting a dirty bit within a page table 536 for that page to indicate the page has been written to, the address translator 556 may also generate an entry within a page modification log 535 in which the address translator 556 sets a dirty bit to indicate that it was a write operation that caused the generation of that entry.

As still further depicted, and as familiar to those skilled in the art, the address translator 556 may include one or more translation look-aside buffers (TLBs) 557 that store entries similar to those of the page table(s) 536 for a limited quantity of the most recently accessed pages. As a result of being incorporated into the address translator 556, accesses to the one or more TLBs 557 may be completed significantly more quickly than accesses to the one or more page tables 536 within the volatile storage 561. Thus, the one or more TLBs 557 may serve as a cache for the one or more page tables 536 to quicken the process of translating virtual addresses into physical addresses associated with more recently accessed pages.

Returning to FIG. 1, in some embodiments, the host OS 640 may incorporate routines to implement virtual machines (VMs) within the processing device 500, and any one of the guest OS(s) 740 (and/or multiple instances of a single guest OS 740) may be executed within each of those VMs. In such embodiments, the host OS 640 may be referred to as a virtual machine manager (VMM). Within each of those VMs, one or more application routines 770 may be executed in the operating environment provided by the execution of a guest OS 740 within that VM. As familiar to those skilled in the art, the provision of VMs within the processing device 500 may require the provision of two layers of address translation in which there may be separate translating between virtual addresses and physical addresses for each application 770 (and/or the guest OS 740) executed within each VM, as well as translating between the physical addresses for each of the VMs and machine addresses that represent the actual addresses of the storage locations that make up the volatile storage 561. This situation arises from the fact that each guest OS 740 executed within one of the VMs may not be aware that the physical address space within each VM is itself a virtualization of the actual address space of the hardware components of the processing device 500, including the storage locations that make up the volatile storage 561.

Figure 2B:
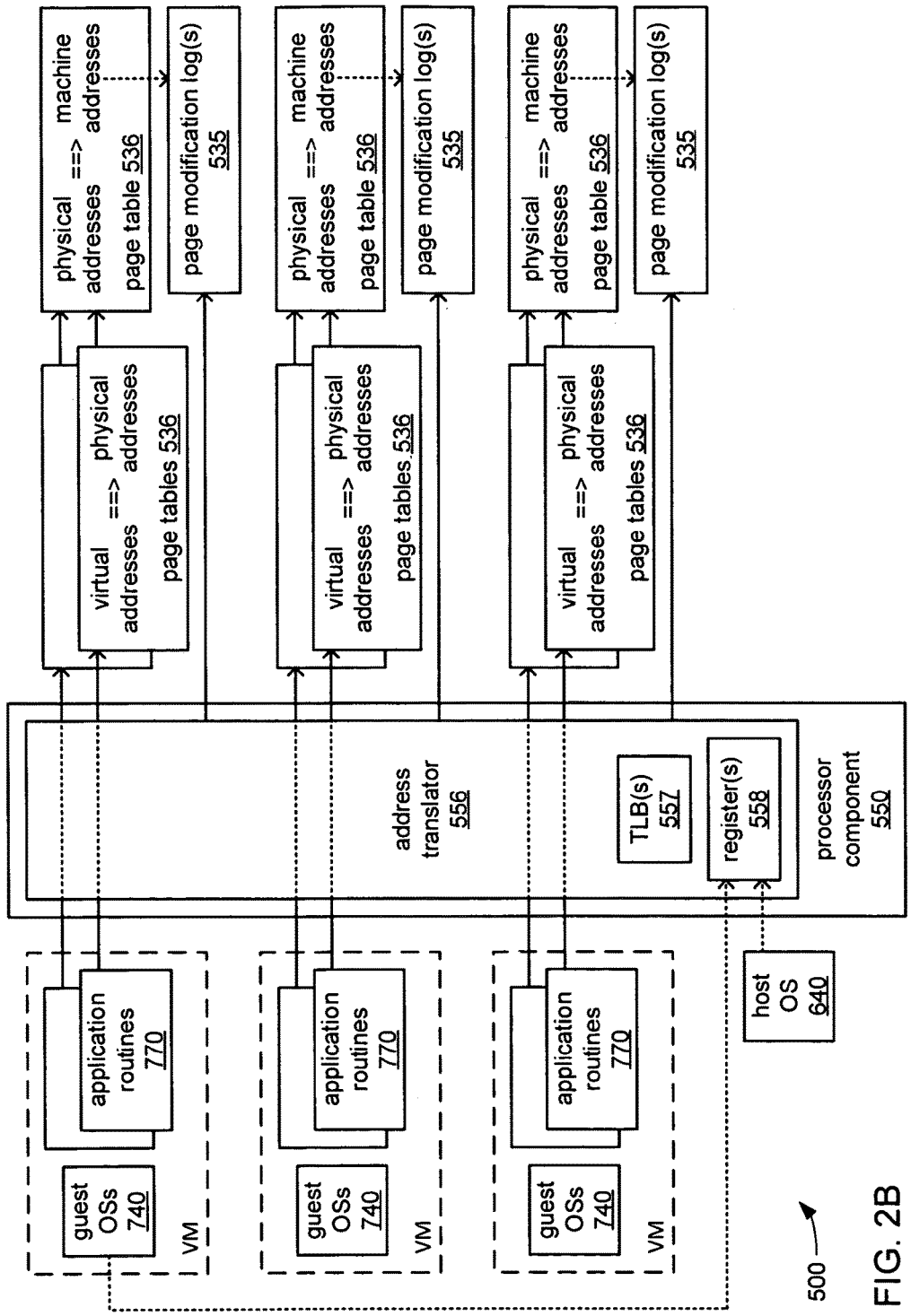

FIG. 2B illustrates in greater detail an example of the use of the page tables 536 and/or the page modification log(s) 535 in such a two layer configuration where VMs are provided to support the execution of multiple guest OSs 740 and/or multiple instances of a single guest OS 740. In various embodiments, and as depicted, multiple guest OSs 740 that are each executed within a separate VM and/or multiple instances of a single OS 740 that are each executed within a separate VM, in addition to the host OS 640, may cooperate with the address translator 556 in various ways to generate a nested set of page tables 536 and/or one or more page modification logs 535.

More specifically, to provide one layer of translation in some embodiments, the each of the guest OSs 740 and/or each instance of a single guest OS 740 may generate one or more page tables 536 within the volatile storage 561, and may then each provide the base address(es) of the one or more page tables 536 that each created to the address translator 556 via the depicted one or more registers 558 incorporated into the address translator 556, or by another mechanism of communication with the address translator 556. As depicted, it may be that each such guest OS 740 and/or each such instance of a single guest OS 740 generates a separate page table 536 for each application routine 770 and/or each instance of a single application routine 770 executed within its environment. Each of these page tables 536 so created may enable translations of virtual addresses employed by an application routine 770 (and/or by a guest OS 740) to a physical address associated with the physical address space created within an associated VM as part of virtualizing the hardware components of the processing device 500.

Again, at least a portion of the physical address space created within each VM may itself be a virtual address space that differs from the actual addresses of the hardware components of the processing device 500 used for each VM. Thus, another layer of address translation is required from the various physical address spaces created within each VM to a single machine address space made up of the actual addresses occupied by the hardware components of the processing device 500. Thus, to provide the other layer of translation in some embodiments, the host OS 640 may generate one or more additional page tables 536 within the volatile storage 561, and may then provide the base address(es) of the one or more additional page tables 536 to the address translator 556 via the depicted one or more registers 558 incorporated into the address translator 556, or by another mechanism of communication with the address translator 556. Alternatively, in other embodiments, the host OS 640 may request that the address translator 556 generate the one or more page tables 536, itself. Again, one of such mechanisms may also be used to generate the one or more page modification logs 535.

As depicted, something of a tree-like arrangement of page tables 536 may result where the physical addresses that the virtual addresses associated for each application routine 770 (and/or for each guest OS 740) are translated to are then routed to the one or more page tables 536 at which those physical addresses are translated to machine addresses. Thus, where a particular application routine 770 (or a guest OS 740) executed within a particular VM makes a read or write access employing a virtual address based on the virtual address space within that VM, the address translator 556 may use a page table 536 associated with that application routine 770 within that VM to translate that virtual address into a physical address associated with that same VM. Then, the address translator 556 may use an additional page table 536 generated in cooperation with the host OS 640 to translate that physical address associated with that VM into a machine address. In so doing, if the access is a write access, then the address translator 556 may set a dirty bit within the entry from which the machine address is obtained to indicate the page has been written to. Further, as depicted, one or more page modification logs 535 may be associated with that additional page table(s) 536 employed in translating physical addresses for that VM to machine addresses. Thus, if the access is a write access, then in addition to setting a dirty bit within an entry of such a page table 536, the address translator 556 may also generate an entry within a page modification log 535 and may set a corresponding dirty bit therein.

It should be noted that while the entries of the page modification log(s) 535 may provide information that is redundant to the information provided in the entries of the page table(s) 536, the organization of the entries in the page modification log(s) 535 may, unlike the entries within the page table(s) 536, be chronological in nature. Stated differently, unlike the page table(s) 536, the order of the entries within the page modification log(s) 535 in conjunction with the flag bits included within each entry may provide an indication of the order in which events affecting pages within the volatile storage 561 (including write accesses) occurred. However, it should also be noted that, despite the specific depiction and discussion of the page modification log(s) 535 being made up of entries that contain similar information to what is contained within the entries of the page table(s) 536 organized within each entry in a similar manner, other embodiments are possible in which the page modification log(s) 535 may use entirely different data structures to organize and/or represent similar information in an entirely different manner.

Figure 3:
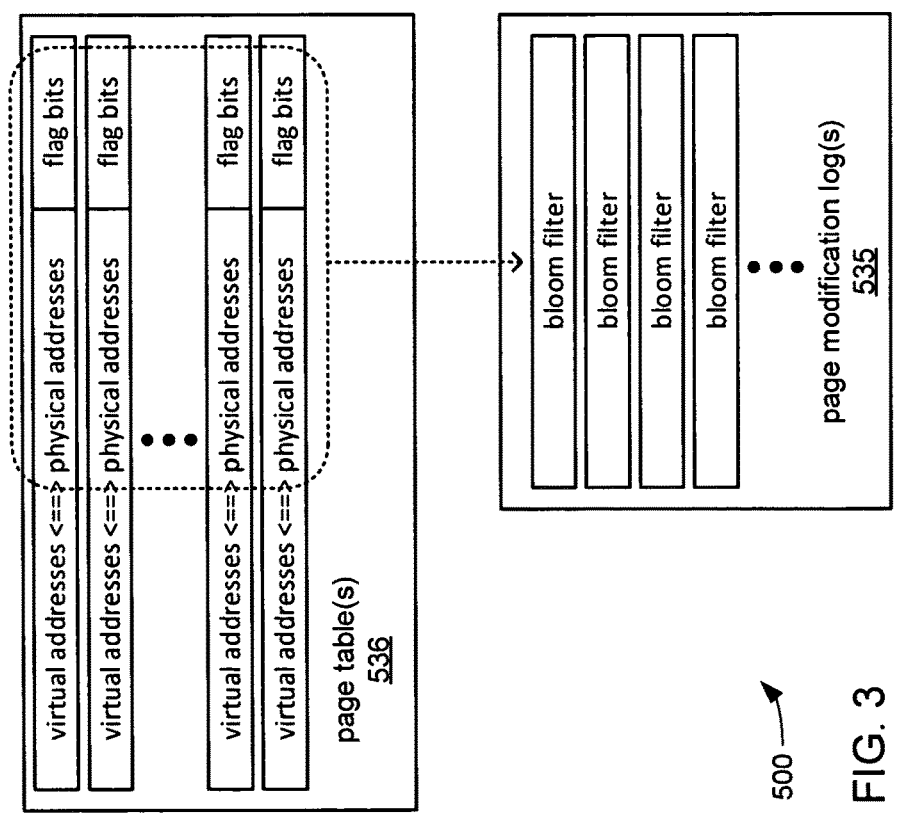
FIG. 3 illustrates an example embodiment of organizing indications of pages having been written to in at least one page modification log.

By way of example, in other embodiments, the page modification log(s) 535 may each be made up of a bit field in which combinations of bits representing pages that have been written to are set through use of a Bloom filter incorporated into the address translator 556 of the processor component 550 and/or another component of the processing device, such as the storage controller 565a. Such use of a Bloom filter may provide some degree of security for the information conveyed in the page modification log(s) 535, since any component or routine within the processing device 500 would need to be provided with information concerning how to interpret possible combinations of bit settings within the bit field. As an alternative to the use of a single bit field within each of the page modification log(s) 535, and as depicted in FIG. 3, each of the page modification log(s) may be made up of multiple entries generated in chronological order in which each entry is made up of a bit field in which combinations of bits representing pages that have been written to during a period of time represented by that entry are set through use of a Bloom filter. In this way, the page modification log(s) 535 may be able to securely provide indications of pages that have been written to in a manner that also conveys a chronology.

Returning to FIG. 1, as the processor component 550 executes the host OS 640 and/or the guest OS(s) 740 to provide one or more operating environments in which the processor component 550 executes the one or more application routines 770, the processor component 850 of the graphics controller 800 may be caused by its execution of the security routine 840 to recurringly scan recently written to pages within the volatile storage 561. In some embodiments, the processor component 850 may limit the performance of such scans to times when the graphics controller 800 is not already engaged in performing graphics operations such as video playback, three-dimensional (3D) rendering, and/or graphics-related functions requiring considerable processing and/or storage resources. In other embodiments, the performance of such scans may be given sufficient priority within the graphics controller 800 that some amount of processing and/or storage resources remain allocated thereto, even at times when such graphics-related functions are also being performed. To identify pages within the volatile storage 561 that have been recently written to, the processor component 850 may recurringly access the one or more page modification logs 535, and may thereby make use of any chronological presentation of that may be provided therein to identify recently written to pages.

It should be noted that, despite the depiction and discussion of both the page table(s) 536 and the page modification log(s) 535 as having entries that are each associated with a single page such that each entry in both is associated with the same quantity of storage space within the volatile storage 561, other embodiments are possible in which the entries within the page table(s) 536 and the page modification log(s) 535 are associated with differing quantities of such storage space. More specifically, in some embodiments, each page within the volatile storage 561 may be divided into multiple smaller blocks of storage space, and the size of such blocks may be selected to be equal to the quantity of data stored within each cache line of the cache 554 of the processor component 550. Alternatively or additionally, in other embodiments, each page within the volatile storage 561 may be divided into multiple smaller blocks of storage space, and the size of such blocks may be selected to be equal to the quantity of data stored within each sub-page of one or more sub-page tables maintained either within the processor component 550 or by the processor component 550 within the volatile storage 561. Such sub-page tables may be made up of entries for each sub-page, and within each such entry may be bits that control the types of accesses that are permitted to be made to each sub-page and/or bits that provide indications of recent events affecting each sub-page, such as a dirty bit indicating a recent write access. Thus, regardless of the exact size of such blocks, while each entry of the page table(s) 536 corresponds to a complete page within the volatile storage 561, each entry of the page modification log(s) 535 may correspond to one of such blocks making up one of those pages. Thus, in such embodiments, the page modification log(s) 535 may provide a chronology of such events as write accesses to storage locations within the volatile storage 561 with a finer granularity than the page table(s) 536. This may enable the processor component 850 to direct its scans for malware within the volatile storage 561 with a corresponding finer granularity, which may reduce amount of unnecessary scanning that is performed.

Figure 4B:
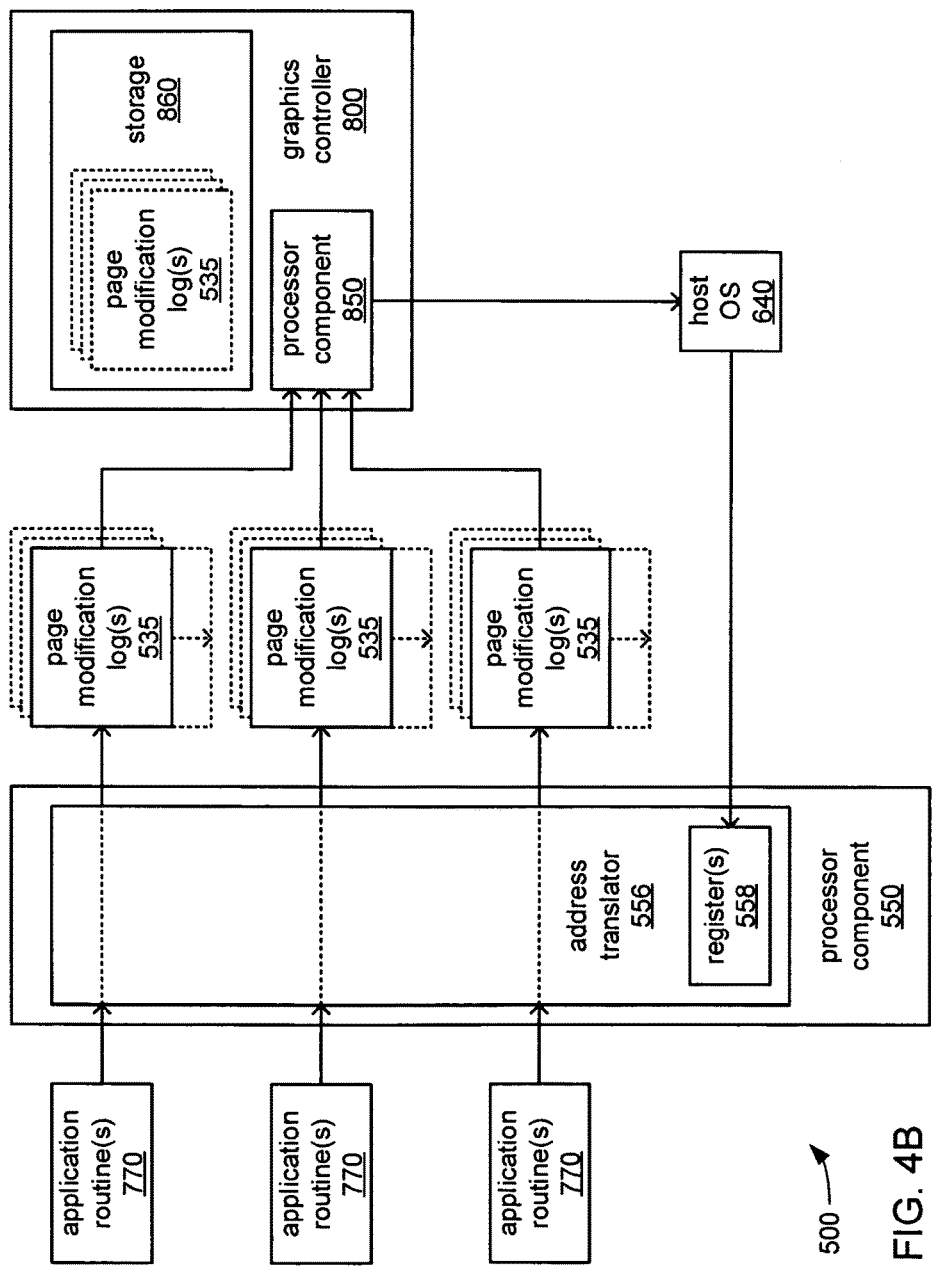
Figure 4C:
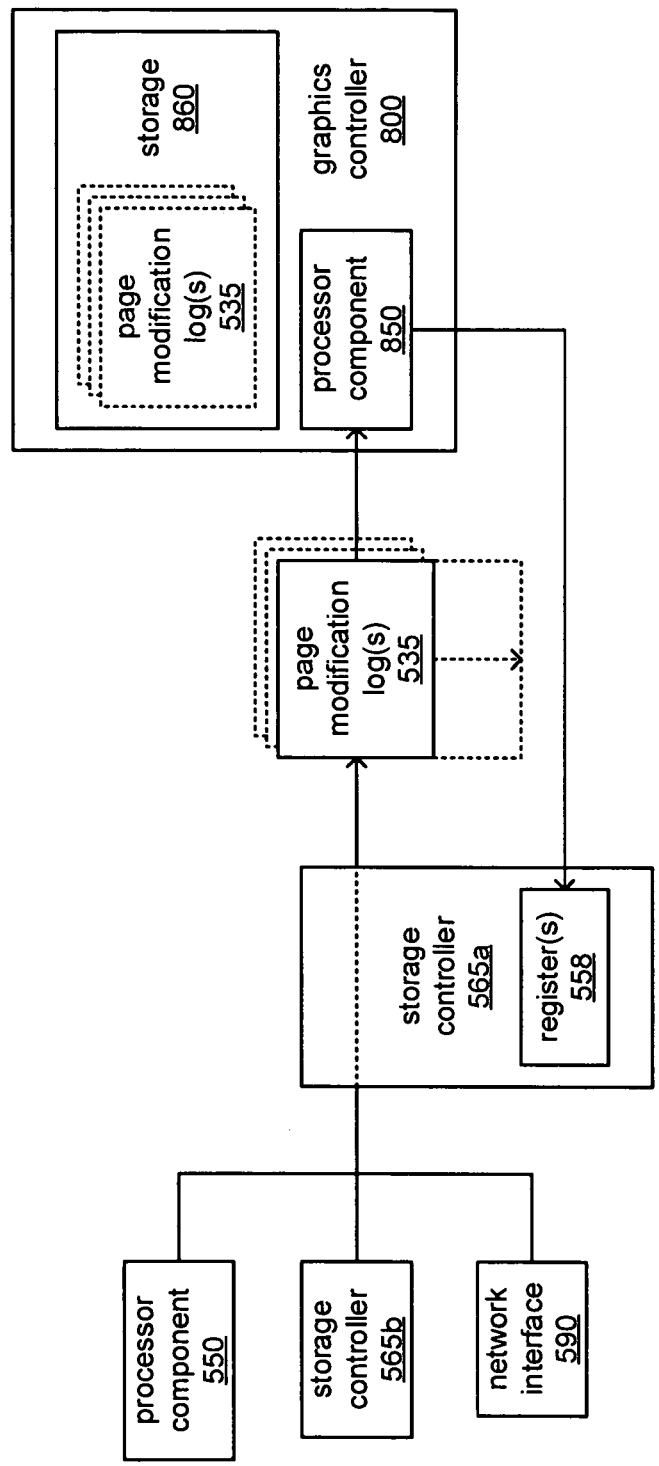

FIGS. 4A, 4B and 4C each depict aspects of an example embodiment of such recurring accesses being made to the page modification log(s) 535. More specifically, FIG. 4A depicts recurring accesses made to page modification log(s) 535 maintained by the address translator 556 where the processor component 550 executes the host OS 640 and no guest OS(s) 740 within VMs, FIG. 4B depicts recurring accesses made to page modification log(s) 535 generated and maintained by the address translator 556 where the processor component 550 executes multiple guest OS(s) 740 in multiple VMs, and FIG. 4C depicts recurring accesses made to page modification log(s) 535 generated and maintained by the storage controller 565a.

Turning to FIG. 4A, the host OS 640 may be executed by the processor component 550 to provide a single operating environment for the execution of one or more of the application routines 770 without the use of VMs. As has been discussed, in some embodiments in which there is no use of VMs, only a single one of the page tables 536 may be generated and maintained, and accordingly, only a single page modification log 535 may be generated and maintained, as depicted with solid lines. In such embodiments, the processor component 850 of the graphics controller 800 may be caused by its execution of the security routine 840 to recurringly access this single page modification log 535 to retrieve indications therefrom of what pages within the volatile storage 561 have recently been written to. As will be explained in more detail, the processor component 850 may then use those indications to perform scans of those recently written pages to attempt to detect malware therein.

As earlier mentioned, the contents of the page modification log(s) 535 may be recurringly cleared. Such clearing may occur as a result of a page modification log 535 being operated as a circular or ring buffer in which the oldest entry is replaced with the next newest entry. Alternatively or additionally, such clearing of each page modification log 535 may occur in concert with the clearing of flag bits in the page table(s) with which each page modification log 535 is associated. In some embodiments, such clearing of flag bits and/or of page table(s) 536 may occur on a regularly repeating interval of time that is often referred to as an epoch. This may be done to ensure that the information conveyed by the flag bits within the entries of the page table(s) 536 does not become stale and/or otherwise lose its usefulness as eventually, over time, all of the pages within the volatile storage 561 may be written to. With regard to the page modification log(s) 535, it may be that since the last occasion on which a page modification log 535 was cleared, only one entry may be generated within that page modification log for each page that is written to during the period of time represented by that page modification log 535 between clearings of that page modification log 535. For each page, that one entry may be so generated only on the first occasion of that page being written to, and after that, no further entries for that page may be generated within that page modification log 535, regardless of how many more times that same page is written to during the time leading up to when that page modification log 535 is next cleared. Thus, such regular clearing of the page modification log 535 may also serve to ensure that the information conveyed therein also does not become stale. Alternatively or additionally, where the page modification log(s) 535 are of fixed size such that only a limited quantity of entries may be generated within each, such clearing of page modification log(s) 535 may be done in response to having been completely filled with entries.

It should be noted that as an alternative to, or in addition to, such clearing occurring at a regular interval of time (e.g., an epoch) and/or in response to capacity limits for entries having been reached, such clearing of at least the page modification log 535 may be triggered by the processor component 850 writing to one or more registers 558 of the address translator 556 (or otherwise signaling the address translator 556) to cause the address translator 556 to clear at least the page modification log 535. The processor component 850 may do this recurringly based on a relatively short interval of time (e.g., shorter than the recurring epoch time period that may be employed with the page table(s) 536) to enable more frequent write accesses to particular pages within the volatile storage 561 to be more readily detected so as to cause, correspondingly, more frequent scanning of those pages to occur.

Unfortunately, while recurringly clearing the page modification log 535 may reduce staleness of the information contained therein and/or clear space therein for new entries, it may also result in the information contained in entries therein that the processor component 850 has not yet retrieved being lost. It may be that there are instances in which the processing resources of the processor component 850 are so thoroughly utilized in performing graphics-related functions that the processor component 850 is not able to keep up with the generation of new entries within the page modification log 535. As a result, information within entries that were generated within the page modification log 535 may be lost as a result of being cleared before the processor component 850 is able to retrieve that information and/or to perform scans on the pages referred to in those entries.

In some embodiments, the processor component 850 may monitor the degree to which a page modification log 535 is full and may respond to an instance in which the page modification log 535 is full (or is close becoming full) by writing to one or more of the registers 558 (or otherwise signaling the address translator 556) to increase the size of the page modification log 535 (as indicated with dotted lines and a dotted arrow) before the fact of becoming full triggers a clearing of that page modification log 535. Alternatively or additionally, the processor component 850 may so signal the address translator 556 to generate one or more additional page modification logs 535 (indicated with dotted lines), thereby creating a set of page modification logs 535 that the address translator 556 and the processor component 850 may access in a rotating (e.g., "round robin") manner to correspondingly fill and retrieve information therefrom. In such an arrangement, each occasion on which the address translator 556 switches from having filled one page modification log 535 of such a set with entries to starting to fill another page modification log 535 in that set may function in a manner analogous to a clearing of a single page modification log 535 in that a new entry for a written to page may be generated within the next page modification log 535 in the set after an entry had been generated for that same page in the preceding page modification log 535 in that set. As yet another alternative to addressing the recurring clearing of a single page modification log 535, the processor component 850 may recurringly buffer the entries that fill up that single page modification log 535 within the storage 860 (and/or within a portion of the storage 560 to which the processor component 850 has access) before each clearing of that single page modification log 535.

It should be noted that, although the host OS 640 may be the only OS executed by the processor component 550, the use of more than one processor core 555 and/or of multiple threads of execution as part of executing the host OS 640 and any of the application routines 770 in the operating environment provided by the host OS 640 may result in the address translator 556 generating and/or maintaining more than one page modification log 535, where each such page modification log 535 is associated with a different one of the processor cores 555 and/or a different one of the threads of execution. Where such multiple page modification logs 535 are so provided, the processor component 850 of the graphics controller 800 may recurringly access each of those page modification logs 535 on a recurring basis to retrieve indications of recently written to pages from each.

Turning to FIG. 4B, multiple guest OS(s) 740 and/or multiple instances of a single guest OS 740 may be executed by the processor component 550 within separate VMs (refer to FIG. 2B) generated by execution of the host OS 640, to provide multiple separate operating environments for the execution of one or more of the application routines 770 within each of the VMs. As has been discussed, in some embodiments in which VMs are used, there may be separate page tables 536 generated and maintained for each VM and/or for each application routine 770 executed within each VM. Accordingly, as has also been discussed, there may be separate page modification logs 535 generated and maintained for each VM and/or for each application routine 770 executed within each VM. Not unlike the above-described situation in which the use of multiple processor cores 555 and/or multiple threads of execution result in the provision of multiple page modification logs 535 that are each associated with one of those processor cores 555 and/or one of those threads, the processor component 850 may be caused by its execution of the security routine 840 to recurringly access each of those page modification logs 535 to retrieve indications therefrom of what pages within the volatile storage 561 have recently been written to.

As familiar to those skilled in the art of VM support, in some embodiments, a VM monitoring component (not specifically depicted) of the host OS 640 (in its role as a VMM) may need to recurringly access the contents of the page tables 536 and/or the page modification logs 535 to support the provision of address translation functionality for each VM. In such embodiments, the host OS 640 may be given exclusive control, not only in generating the page tables 536, but over the manner in which the address translator 556 maintains the page tables 536, and correspondingly, the page modification logs 535. Thus, such a VM monitoring component may configure various aspects of the page tables 536 and/or of the page modification logs 535 in a manner selected to enhance the efficiency of providing such support. In some of such embodiments, the host OS 640 may cooperate with the address translator 556 to generate one or more sets of page tables 536 that the address translator 556 may rotate among (e.g., in a round-robin manner) in using different ones of the page tables 536 within each such set to perform address translations and to record events associated with pages, such as writing one or more bytes thereto. A VM monitoring component of the host OS 640 may effect such a rotation at a regular interval (e.g., a recurring period of time, such as an epoch) and/or based on other criterion as part of avoiding making use of any one page table 536 for a long enough period of time for the information provided by its flag bits to be deemed to have become stale. It may be that host OS 640 causes the execution of a routine of the host OS 640 within one of the VMs that monitors the status of the page tables 536 and/or the page modification tables 535, and employs one or more instructions of the instruction set of the processor component 550 to cause such a rotation when any of a variety of criterion are met, including and not limited to, avoiding one or more page modification logs 535 from becoming full such that a time-consuming switching of contexts among VMs and/or between a VM and VM monitoring component to occur. Where the processor component 550 conforms to the IA-32 or IA-64 architectures of processor components offered by Intel® Corporation of Santa Clara, Calif., such one or more instructions may be one or more forms of the VMFUNC instruction included in instruction sets of such processor components to provide support for the use of VMs.

Regardless of the manner in which each rotation among page tables 536 is triggered, each such rotation may be treated by the address translator 556 as a form of clearing of the flag bits for all of the pages inasmuch as the address translator 556 may clear at least a subset of the page modification log(s) 535 on each occasion of rotating among page tables 536. This may raise the earlier-discussed concern of information contained within one or more page modification logs 535 being lost due to such clearings before the processor component 850 is able to access it and/or perform scans for malware based on it. Again, to address this, the processor component 850 may seek to increase the size of each of the page modification logs 535 and/or to cause the formation of sets of page modification logs 535. Thus, the processor component 850 may send requests to the host OS 640 to make changes to the size of the page modification logs 535 and/or to generate separate sets of the page modification logs 535 for each VM to better enable their use by the processor component 850 in support of scanning for malware. Alternatively or additionally, the processor component 850 may buffer the contents of the page modification logs within the storage 860 and/or within a portion of the storage 560 to which the processor component 850 has access, as has been previously described.

In some embodiments, the processor component 850 may, through cooperation with a routine of the host OS 640 and after taking one or more measures to preserve information within one or more page modification logs 535, make use of such an instruction as VMFUNC to call for a rotation among page tables 536, itself. This may be deemed desirable where such a rotation among page tables 536 results in a clearing of and/or rotation among page modification tables 535 such that new entries within page modification log(s) 535 are again generated for pages that have previously been written to such that new entries page modification log(s) 535 may not otherwise have been generated such that the information contained within one or more page modification logs 535 may have become (or may soon become) stale.

Turning to FIG. 4C, in addition to or as an alternative to the address translator 556 of the processor component 550 generating and maintaining one or more page modification logs 535, the storage controller 565a may do so. This may be deemed desirable as a way to include write accesses (and/or other events affecting pages within the volatile storage 561) made by components of the processing device 500 other than the processor component 550 on behalf of the host OS 640 and/or the guest OS(s) 740. More specifically, in some embodiments, other components of the processing device 500, such as the depicted storage controller 565b and/or the network interface 590, may have the capability to, themselves, make accesses to pages within the volatile storage 561, including write accesses. It may be that the storage controller 565b is capable of becoming a bus master device able to, itself, copy data from the non-volatile storage 562 and into the volatile storage 561. Alternatively or additionally, the network interface 590 may be capable of becoming a bus master device such that it is able to directly store data received from the network 999 into the volatile storage 561. Where all accesses to the volatile storage 561 must be performed through the storage controller 565a, the storage controller 565a may be deemed to be in an advantageous location within the processing device 500 to monitor all accesses to the pages defined within the volatile storage 561, and to record in page modification log(s) 535 indications of events affecting those pages, such as write accesses to particular ones of those pages.

As depicted, it may be that the register(s) 558 (or other mechanism) to configure the generation and maintenance of the one or more page modification logs 535 is incorporated into the storage controller 565a, rather than into the address translator 556 of the processor component 550. Again, the processor component 850 may access the registers 558, either directly or through the host OS 640, to configure various aspects of the generation and maintenance of the page modification log(s) 535 to prevent loss of information in the entries thereof, as previously discussed.

Figure 5:
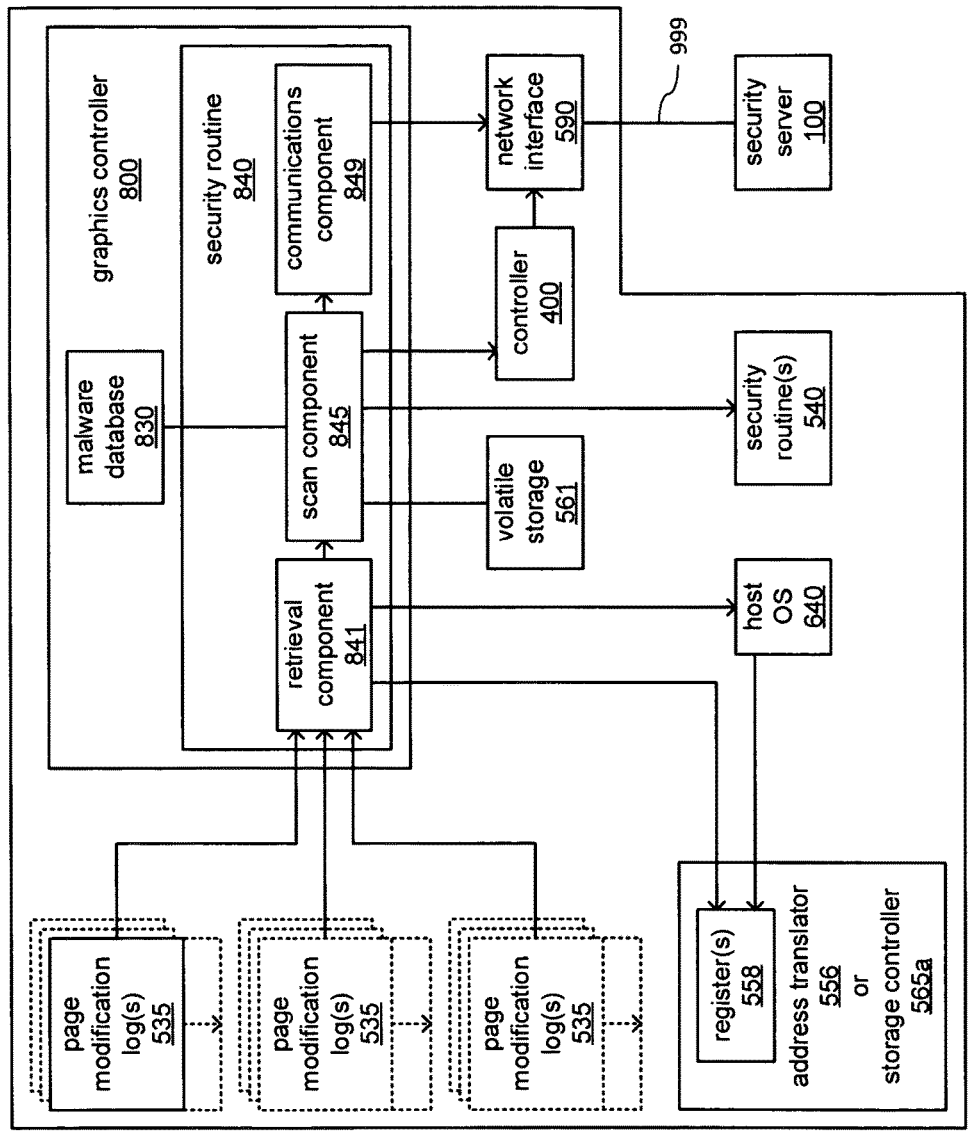
FIG. 5 illustrates an example embodiment of scanning for and responding to malware within volatile storage.

FIG. 5 depicts aspects of scanning for and responding to malware within the volatile storage 561 in greater detail. As depicted, the security routine 840 may be made up of multiple components 841, 845 and/or 849 such that execution of the security routine 840 by the processor component 850 may entail execution of one or more of these components. Again, it may be deemed desirable for the security routine 840 to cause the processor component 850 to perform such operations to take advantage of vector operations and/or other features that may be found within a processor component of a graphics controller that may enable more efficient performance of scanning pages for portions of malware.

As depicted, the security routine 840 may include a communications component 849 that may be executable by the processor component 850 to operate the network interface 890 to transmit and receive signals via the network 999 as has been described. Among those signals may be signals conveying indications of malware having been detected, a portion of the detected malware and/or commands for actions to take to mitigate the consequences of the presence of the detected malware. Such signals may be exchanged at least between the security server 100 and the processing device 500, but may also be exchanged between the security server 100 and multiple ones of the processing device 500, as will be explained in greater detail. As will be recognized by those skilled in the art the communications component 849 may be selected to be operable with whatever type of interface technology is selected to implement the network interface 890.

As also depicted, the security routine 840 may include a retrieval component 841 that may be executable by the processor component 850 to perform the earlier described recurring accesses to one or more page modification logs 535 to identify pages within the volatile storage 561 that have recently been written to. Again, depending on whether VMs are used, whether more than one processor core 555 is used and/or whether more than one thread of execution is used, there may be a single page modification log 535 or multiple ones thereof. Also, the retrieval component 841 may signal the address translator 556 or the storage controller 565a, either directly or through the host OS 640, to enlarge one or more page modification logs 535 to make room for more entries within each, and/or to create one or more sets of page modifications logs 535 that are filled with entries and are accessed by the retrieval component 841 in a rotating (e.g., round-robin) manner to accommodate the ongoing storage therein of more entries. Again, such recurring accesses to the one or more page modification logs 535 may be made by the retrieval component 841 while the processor component 550 executes the host OS 640, one or more guest OS(s) 740 and/or one or more application routines 770.

In addition to recurringly accessing one or more page modification logs 535 for indications of recently written to pages, the retrieval component may monitor the one or more page modification logs 535 for an increased rate of generations of entries therein that is measurably and significantly greater than an observed rate at which entries are normally generated therein. Such an increased rate may be the result of an attempt by malware to degrade the ability to perform scans of pages based on entries within the one or more page modification logs 535. The aim may be to force a filling up of the one or more page modification logs 535 to cause a clearing thereof before information in entries that may lead to the detection of the malware can be retrieved and used to do so.

As further depicted, the security routine 840 may include a scan component 845 that may be executable by the processor component 850 to perform the earlier described scanning of pages within the volatile storage 561 that have been indicated in the one or more page modification logs 535 to have been written to, as identified in the recurring accesses made to the one or more page modification logs 535 by the retrieval component 841. In scanning such pages within the volatile storage 561, the scan component 845 may attempt to match the contents of those pages with signatures of known pieces of malware stored within the malware database 830. As has been previously discussed, the unpacking of malware (e.g., decompressing of malware) necessarily entails the writing of at least a portion of the unpacked instructions of the malware into one or more pages of the volatile storage 561. As such writing of those one or more pages is recorded within the one or more page modification logs 535, thereby leading to the identification of those pages as having been written to by the retrieval component 841, the scan component 845 may be triggered by the retrieval component 841 caused to scan those pages. This provides an opportunity for the scan component 845 to compare the pattern of the now unpacked instructions of that malware to the signatures within the malware database to attempt to detect and identify that malware.

Presuming that the scan component 845 does detect the presence of malware in its unpacked form within one or more pages of the volatile storage 561, the scan component 845 may take any of a variety of actions to mitigate the consequences of the presence of that malware. By way of example, the scan component 845 may send an indication of the malware having been detected, its location within the volatile storage 561 and/or its identity to at least one of the security routines 540. In embodiments in which VMs are not used, there may be a single security routine 540 executed within the operating environment provided by the execution of the host OS 640 by the processor component 550, and the single security routine 540 may include a routine for removing or otherwise addressing the detection of malware within that operating environment. In embodiments in which VMs are used, there may be a security routine 540 executed within the operating environment of the host OS 640 as executed by the processor component 550, and/or there may be one or more security routines 540 executed within the operating environments of the one or more VMs as provided through the execution of combinations of the host OS 640 and a guest OS 740 associated with each VM. In such an embodiment in which VMs are used, the scan component 845 may employ the address(es) of the pages in which the detected malware is found to determine whether the malware is found within the operating environment of the host OS 640 or within the operating environment of one of the VMs, and may send the indication of the detection of the malware to the one of the security routines 540 that is executed within the operating environment in which the malware is found. Upon receiving such an indication, the security routine 540 that is so signaled may access its own separate malware database 530 to confirm the identity of the malware and/or to identify it with greater specificity as part of determining what action to take against the malware.

However, there may be instances where the address(es) of the page(s) in which the malware is found indicate that the malware has already compromised core routines of an OS or of a one of the security routines 540 executed within that operating environment such that there may be no way for the one of the security routines 540 associated with that environment to effectively address the presence of the malware. In such embodiments, the scan component 845 may cooperate with the communications component 849 to operate the network interface 590 to transmit an indication of the malware having been detected to the security server 100. In some embodiments, the indication may include an indication of the identity of the malware (as determined using the malware database 830) to enable a determination by the security server 100 of what measures to take and/or a copy of at least a portion of the malware to enable further analysis of the malware by the security server 100. The security server 100 may take any of a variety of actions in response to the indication of the detection of the malware. By way of example, the security server 100 may transmit a command to the processing device 500 to disconnect itself from the network 999 (which may be carried out by the controller 400) and/or may transmit commands to other devices (not shown) that are coupled to the network 999 to refrain from any further communications with the processing device 500.

As an alternative to or in addition to transmitting such an indication to the security server 100, the scan component 845 may provide an indication to the controller 400 (if present within the processing device 500) of the detection of the malware. The controller 400 may, in response, take any of a variety of actions to mitigate the consequences of the presence of the malware. By way of example, the controller 400 may trigger a reinitialization of the processing device 500 in an effort to purge the contents of the volatile storage 561, including the malware. Alternatively or additionally, the controller 400 may operate the network interface 590 to transmit an indication of the detection of the malware to the security server 100 and/or to disconnect the processing device 500 from the network 999 to avoid spreading the malware to other devices coupled to the network 999.

The scan component 845 may receive an indication from the retrieval component 841 of an apparent effort based on a measurably and significantly greater rate of generation of entries within one or more page modification logs 535 to degrade the ability of the scans performed by the scan component 845 to detect malware by causing a clearing of one or more of the page modification logs 535 before at least some entries are able to be accessed. The scan component 845 may respond by performing a scan of all pages within the volatile storage 561.

In various embodiments, the processor components 150, 450, 550 and/or 850 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storages 160, 460, 560 and/or 860 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of the network interfaces 190 and/or 590 may employ any of a wide variety of signaling technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
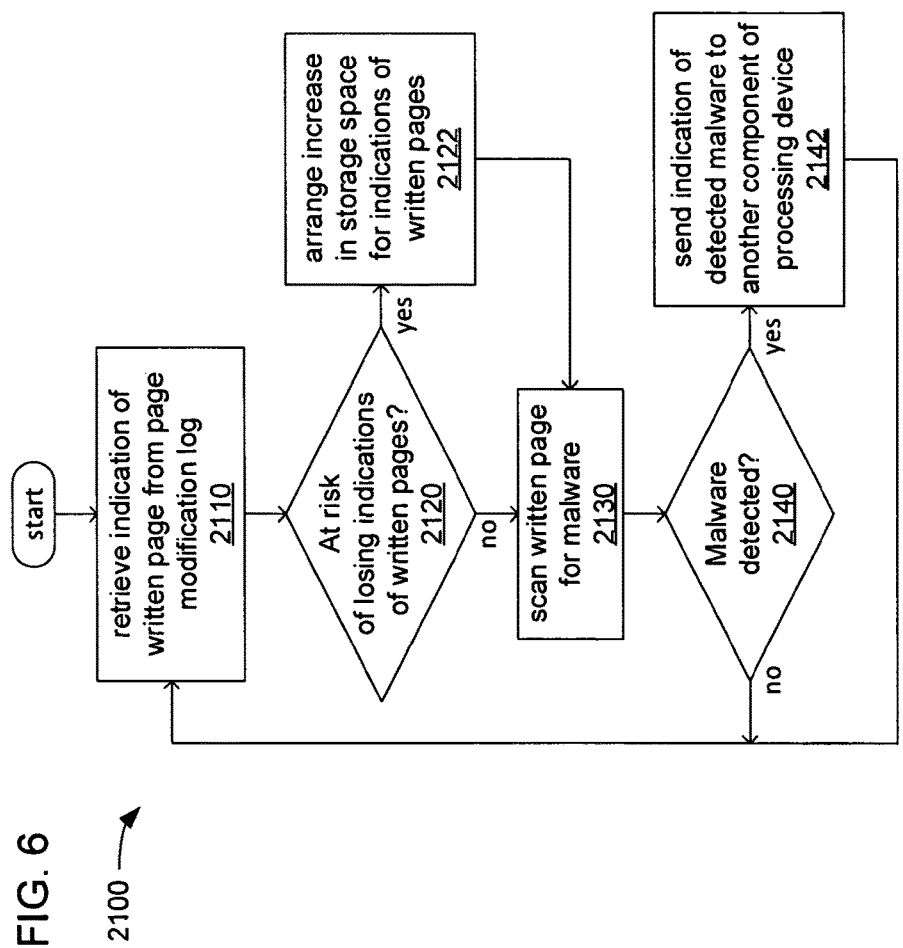
FIG. 6 illustrates a logic flow according to an embodiment.

FIG. 6 illustrates an embodiment of a logic flow 2100. The logic flow 2100 may be representative of some or all of the operations executed by one or more embodiments described herein. More specifically, the logic flow 2100 may illustrate operations performed by the processor component 850 in executing at least the security routine 840, and/or performed by other component(s) of the processing device 500. In particular, the logic flow 2100 is focused on operations to recurringly scan for malware.

At 2110, a processor component of a graphics controller a processing device (e.g., the processor component 850 of the graphics controller 800 of the processing device 500) may retrieve an indication of a recently written to page from a page modification log (e.g., one of the page modification logs 535). As has been discussed, there may be one or more than one page modification log generated and maintained either by an address translator of a main processor component of the processing device (e.g., the address translator 556 of the processor component 550) or by a storage controller that controls access to the volatile storage in which the pages have been defined (e.g., the storage controller 565a controlling access to the volatile storage 561).

At 2120, a check is made as to whether there is a risk of losing further indications in one or more page modification logs of pages that have recently been written to. As previously discussed, the one or more page modification logs recurringly accessed by the processor component of the graphics controller may be recurringly cleared based on any of a variety of factors that may not be under the control of the processor component of the graphics controller. As a result, entries conveying indications of recently written to pages may be lost before the processor component of the graphics controller is able to access them and/or to act on them. If there is such a risk at 2120, then at 2122, the processor component of the graphics controller may signal the address translator and/or the storage controller to enlarge one or more page modification logs and/or to replace single page modification logs with sets thereof to provide more room for more entries conveying indications of recently written to pages.

Regardless of whether there is such a risk, at 2130, the processor component of the graphics controller may scan for malware the recently written page within the volatile storage for which the indication was retrieved from the page modification log. As has been discussed, packed malware must be unpacked to be executable, and this necessarily entails writing unpacked portions of the malware into pages within the volatile storage, which may result in one or more entries within a page modification log, which may be identified and then acted upon by the processor component of the graphics controller by scanning those pages.

At 2140, if malware is not detected in the scan of the page, then the processor component of the graphics controller retrieves another indication of a recently written to page from a page modification log at 2110. However, if malware is detected at 2140, then at 2142, the processor component of the graphics controller may provide an indication of such detection to another component of the processing device, including and not limited to, a security routine (e.g., the security routine 540) that may further analyze the malware and/or act to remove it, a controller of the processing device (e.g., the controller 400) that may trigger a reinitialization of the computing device, or a network interface of the processing device to be relayed to a security server (e.g., the network interface 590 to relay the indication to the security server 100).

Figure 7:
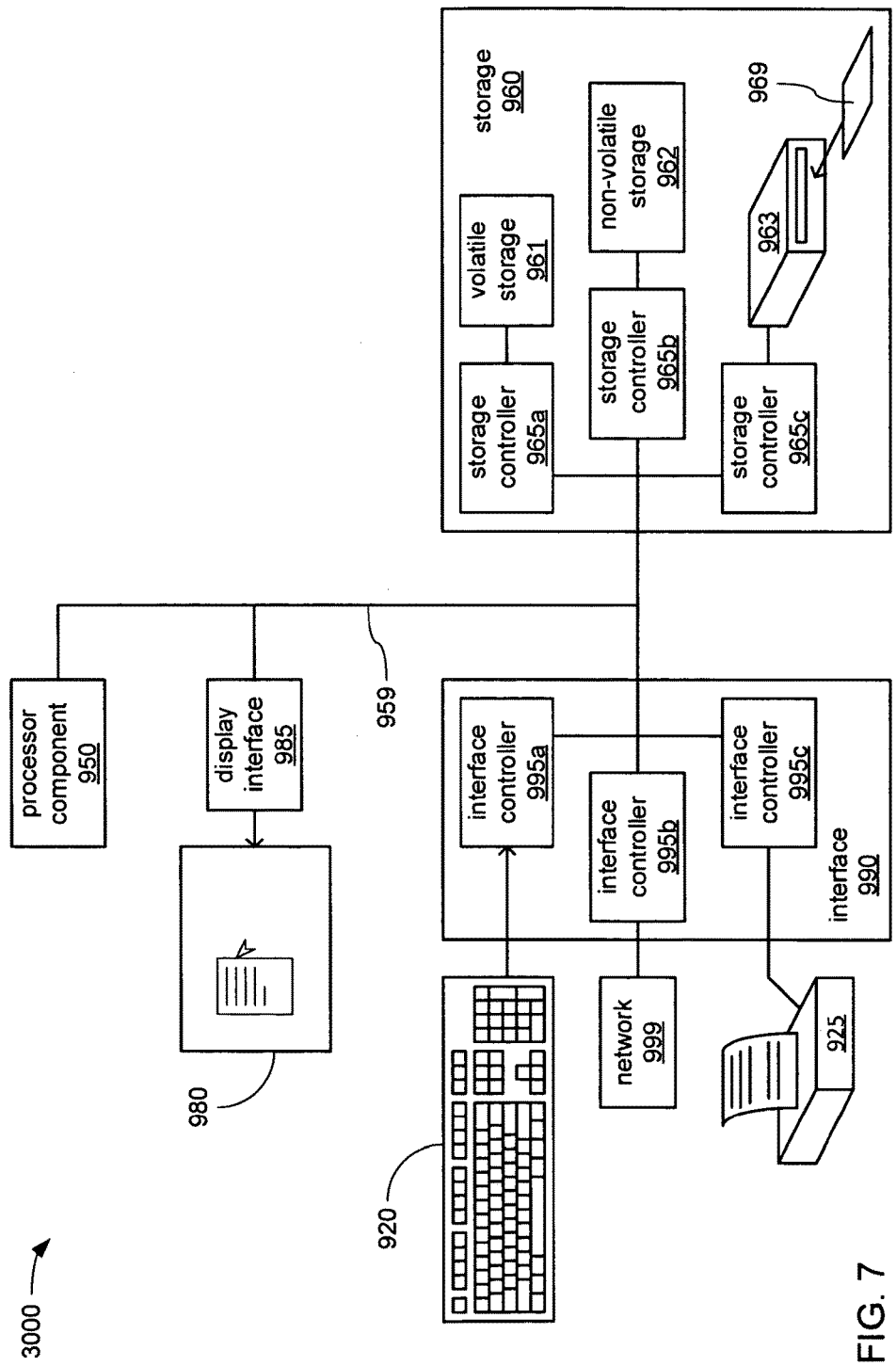
FIG. 7 illustrates a processing architecture according to an embodiment.

FIG. 7 illustrates an embodiment of an exemplary processing architecture 3000 suitable for implementing various embodiments as previously described. More specifically, the processing architecture 3000 (or variants thereof) may be implemented as part of one or more of the devices 100, 200, 304, 305 or 500, and/or the controller 400. It should be noted that components of the processing architecture 3000 are given reference numbers in which the last two digits correspond to the last two digits of reference numbers of at least some of the components earlier depicted and described as part of these devices and/or controllers. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire device (e.g., an entire computer). By way of illustration, both an application running on a server and the server can be a component. One or more components can reside within a process and/or thread of execution, and a component can be localized on one device and/or distributed between two or more devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a device includes at least a processor component 950, a storage 960, an interface 990 to other devices, and a coupling 959. As will be explained, depending on various aspects of a device implementing the processing architecture 3000, including its intended use and/or conditions of use, such a device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (which may correspond to the processor component 450) may include any of a wide variety of commercially available processors, employing any of a wide variety of technologies and implemented with one or more cores physically combined in any of a number of ways.

As previously discussed, the storage 960 (which may correspond to the storage 460) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between devices). This depiction of the storage 960 as possibly including multiple distinct types of storage is in recognition of the commonplace use of more than one type of storage device in devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interface(s) 490) may employ any of a variety of signaling technologies corresponding to any of a variety of communications technologies that may be employed to communicatively couple a device to one or more other devices. Again, one or both of various forms of wired or wireless signaling may be employed to enable the processor component 950 to interact with input/output devices (e.g., the depicted example keyboard 920 or printer 925) and/or other devices, possibly through a network (e.g., the network 999) or an interconnected set of networks. In recognition of the often greatly different character of multiple types of signaling and/or protocols that must often be supported by any one device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other devices through the depicted network 999 (perhaps a network made up of one or more links, smaller networks, or perhaps the Internet). More specifically, the interface controller 995b may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface controller 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a device is communicatively coupled to (or perhaps, actually incorporates) a display (e.g., the depicted example display 980), such a device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a first processor component of a processing device to generate entries in a chronological order within a first page modification log maintained within a first storage divided into multiple pages, each entry to indicate a write access made by the first processor component to a page of the multiple pages; a retrieval component of a graphics controller of the processing device to recurringly retrieve indications from the first page modification log of at least one recently written page of the multiple pages; and a scan component of the graphics controller to recurringly scan the at least one recently written page to detect malware within the at least one recently written page.

In Example 2, which includes the subject matter of Example 1, the first processor component may include an address translator to support virtual addressing based on the multiple pages and to generate each entry within the first page modification log in response to a provision of an address translation for a write access to a page of the multiple pages.

In Example 3, which includes the subject matter of any of Examples 1-2, the address translator may walk at least one page table maintained within the first storage to translate addresses to enable one of an operating system (OS) that employs virtual addressing or an application routine supported by the OS to access at least a subset of the multiple pages.

In Example 4, which includes the subject matter of any of Examples 1-3, the address translator may walk multiple layers of page tables maintained within the first storage to translate addresses to support multiple virtual machines (VMs) generated by a host OS and to enable a guest OS that employs virtual addressing within one of the VMs to access at least a subset of the multiple pages associated with the one of the VMs by the host OS.

In Example 5, which includes the subject matter of any of Examples 1-4, the address translator may generate the entries within multiple page modification logs, each VM may be associated with at least one page modification log of the multiple page modification logs, the multiple page modification logs may include the first page modification log, and the retrieval component may recurringly retrieve indications from the multiple page modification logs of recently written pages.

In Example 6, which includes the subject matter of any of Examples 1-5, the first page modification log may accommodate a limited quantity of the entries and the retrieval component may cooperate with the address translator to generate the entries within a second page modification log maintained within the first storage to allow the retrieval component more time to retrieve indications of recently written pages from the entries within the first page modification log before the entries within the first page modification log are overwritten with new entries generated by the address translator.

In Example 7, which includes the subject matter of any of Examples 1-6, the address translator may rotate among at least the first and second page modification logs to generate the entries, and the retrieval component may rotate among at least the first and second page modification logs to retrieve indications of recently written pages.

In Example 8, which includes the subject matter of any of Examples 1-7, the graphics controller may include a second processor component to execute at least one of the retrieval component or the scan component.

In Example 9, which includes the subject matter of any of Examples 1-8, the second processor component may selectively execute at least one of the retrieval component or the scan component based on a current degree of use of processing resources of the second processor component by graphics operations performed by the second processor component.

In Example 10, which includes the subject matter of any of Examples 1-9, the graphics controller may include a second storage to store a malware database that may include indications of patterns of at least executable instructions for use by the scan component to detect malware.

In Example 11, which includes the subject matter of any of Examples 1-10, the first storage may store a security routine executed by the first processor component to counteract malware, and the scan component may provide an indication to the security routine of malware detected within a page by the scan component.

In Example 12, which includes the subject matter of any of Examples 1-11, the apparatus may include a network interface to couple the processing device to a network, and the scan component may analyze an address of a page in which the malware is detected to determine a severity associated with the malware and may transmit an indication to a security server via the network of malware detected within a page by the scan component in lieu of provision of the indication to the security routine based on the severity.

In Example 13, which includes the subject matter of any of Examples 1-12, the apparatus may include a network interface to couple the processing device to a network, and the scan component may operate the network interface to disconnect the processing device from the network in response to detection of malware within a page.

In Example 14, an apparatus includes a storage controller of a processing device to generate entries in a chronological order within a first page modification log maintained within a first storage coupled to the storage controller and divided into multiple pages, each entry to indicate a write access made to a page of the multiple pages; a retrieval component of a graphics controller of the processing device to recurringly retrieve indications from the first page modification log of at least one recently written page of the multiple pages; and a scan component of the graphics controller to recurringly scan the at least one recently written page to detect malware within the at least one recently written page.

In Example 15, which includes the subject matter of Example 14, the first page modification log to accommodate a limited quantity of the entries and the retrieval component to cooperate with the storage controller to generate the entries within a second page modification log maintained within the first storage to allow the retrieval component more time to retrieve indications of recently written pages from the entries within the first page modification log before the entries within the first page modification log are overwritten with new entries generated by the storage controller.

In Example 16, which includes the subject matter of any of Examples 14-15, the storage controller may rotate among at least the first and second page modification logs to generate the entries, and the retrieval component may rotate among at least the first and second page modification logs to retrieve indications of recently written pages.

In Example 17, which includes the subject matter of any of Examples 14-16, the graphics controller may include a second processor component to execute at least one of the retrieval component or the scan component.

In Example 18, which includes the subject matter of any of Examples 14-17, the second processor component may selectively execute at least one of the retrieval component or the scan component based on a current degree of use of processing resources of the second processor component by graphics operations performed by the second processor component.

In Example 19, which includes the subject matter of any of Examples 14-18, the graphics controller may include a second storage to store a malware database that may include indications of patterns of at least executable instructions for use by the scan component to detect malware.

In Example 20, which includes the subject matter of any of Examples 14-19, the apparatus may include a network interface to couple the processing device to a network, and the scan component may operate the network interface to disconnect the processing device from the network in response to detection of malware within a page.

In Example 21, a computing-implemented method includes generating, by a first processor component of a processing device, entries in a chronological order within a first page modification log maintained within a first storage divided into multiple pages, each entry to indicate a write access made by the first processor component to a page of the multiple pages; recurringly retrieving, by a graphics controller of the processing device, indications from the first page modification log of at least one recently written page of the multiple pages; and recurringly scanning, by the graphics controller, the at least one recently written page to detect malware within the at least one recently written page.

In Example 22, which includes the subject matter of Example 21, the method may include providing address translations for accesses to pages of the multiple pages to support virtual addressing based on the multiple pages; and generating each entry within the first page modification log in response to providing an address translation for a write access to a page of the multiple pages.

In Example 23, which includes the subject matter of any of Examples 21-22, the method may include generating, by the first processor component, at least one page table within the first storage; and walking, by the first processor component, the at least one page table to translate addresses to enable one of an operating system (OS) that employs virtual addressing or an application routine supported by the OS to access at least a subset of the multiple pages.

In Example 24, which includes the subject matter of any of Examples 21-23, the method may include generating, by the first processor component, multiple layers of page tables within the first storage; and walking, by the first processor component, the multiple layers of page tables to translate addresses to support multiple virtual machines (VMs) generated by a host OS and to enable a guest OS that employs virtual addressing within one of the VMs to access at least a subset of the multiple pages associated with the one of the VMs by the host OS.

In Example 25, which includes the subject matter of any of Examples 21-24, the method may include generating, by the first processor component, the entries within multiple page modification logs, each VM associated with at least one page modification log of the multiple page modification logs, the multiple page modification logs including the first page modification log; and recurringly retrieving, by the graphics controller, indications from the multiple page modification logs of recently written pages.

In Example 26, which includes the subject matter of any of Examples 21-25, the first page modification log may accommodate a limited quantity of the entries, and the method may include generating, by the first processor component, the entries within a second page modification log maintained within the first storage to allow more time for retrieving indications of recently written pages from the entries within the first page modification log before the entries within the first page modification log are overwritten with new entries generated by the address translator.

In Example 27, which includes the subject matter of any of Examples 21-26, the method may include rotating, by the first processor component, among at least the first and second page modification logs to generate the entries; and rotating, by the graphics controller, among at least the first and second page modification logs to retrieve indications of recently written pages.

In Example 28, which includes the subject matter of any of Examples 21-27, the graphics controller may include a second processor component, and the method may include selectively performing at least one of the recurring retrieving of indications from the first page modification log of at least one recently written page of the multiple pages, or the recurring scanning of the at least one recently written page to detect malware within the at least one recently written page based on a current degree of use of processing resources of the second processor component by graphics operations performed by the second processor component.

In Example 29, which includes the subject matter of any of Examples 21-28, the graphics operations may include at least one of providing a user interface, rendering a three-dimensional object or decompressing a motion video.

In Example 30, which includes the subject matter of any of Examples 21-29, the method may include analyzing an address of a page in which the malware is detected to determine a severity associated with the malware; and providing an indication of the malware detected within the page to a security routine executed by the first processor component or transmitting an indication of the malware detected within the page to a security server via the network based on the severity.

In Example 31, which includes the subject matter of any of Examples 21-30, the method may include operating, by the graphics controller, a network interface of the processing device to disconnect the processing device from a network in response to detecting malware within a page.

In Example 32, at least one tangible machine-readable storage medium includes instructions that when executed by a processing device, may cause the processing device to generate, by a first processor component of a processing device, entries in a chronological order within a first page modification log maintained within a first storage divided into multiple pages, each entry to indicate a write access made by the first processor component to a page of the multiple pages; recurringly retrieve, by a graphics controller of the processing device, indications from the first page modification log of at least one recently written page of the multiple pages; and recurringly scan, by the graphics controller, the at least one recently written page to detect malware within the at least one recently written page.

In Example 33, which includes the subject matter of Example 32, the processing device may be caused to provide address translations for accesses to pages of the multiple pages to support virtual addressing based on the multiple pages; and generate each entry within the first page modification log in response to providing an address translation for a write access to a page of the multiple pages.

In Example 34, which includes the subject matter of any of Examples 32-33, the processing device may be caused to generate, by the first processor component, at least one page table within the first storage; and walk, by the first processor component, the at least one page table to translate addresses to enable one of an operating system (OS) that employs virtual addressing or an application routine supported by the OS to access at least a subset of the multiple pages.

In Example 35, which includes the subject matter of any of Examples 32-34, the processing device may be caused to generate, by the first processor component, multiple layers of page tables within the first storage; and walk, by the first processor component, the multiple layers of page tables to translate addresses to support multiple virtual machines (VMs) generated by a host OS and to enable a guest OS that employs virtual addressing within one of the VMs to access at least a subset of the multiple pages associated with the one of the VMs by the host OS.

In Example 36, which includes the subject matter of any of Examples 32-35, the processing device may be caused to generate, by the first processor component, the entries within multiple page modification logs, each VM associated with at least one page modification log of the multiple page modification logs, the multiple page modification logs including the first page modification log; and recurringly retrieve, by the graphics controller, indications from the multiple page modification logs of recently written pages.

In Example 37, which includes the subject matter of any of Examples 32-36, the first page modification log may accommodate a limited quantity of the entries, and the processing device may be caused to generate, by the first processor component, the entries within a second page modification log maintained within the first storage to allow more time for retrieving indications of recently written pages from the entries within the first page modification log before the entries within the first page modification log are overwritten with new entries generated by the address translator.

In Example 38, which includes the subject matter of any of Examples 32-37, the processing device may be caused to rotate, by the first processor component, among at least the first and second page modification logs to generate the entries; and rotate, by the graphics controller, among at least the first and second page modification logs to retrieve indications of recently written pages.

In Example 39, which includes the subject matter of any of Examples 32-38, the graphics controller may include a second processor component, and the processing device may be caused to selectively perform at least one of the recurring retrieval of indications from the first page modification log of at least one recently written page of the multiple pages, or the recurring scan of the at least one recently written page to detect malware within the at least one recently written page based on a current degree of use of processing resources of the second processor component by graphics operations performed by the second processor component.

In Example 40, which includes the subject matter of any of Examples 32-39, the graphics operations may include at least one of providing a user interface, rendering a three-dimensional object or decompressing a motion video.

In Example 41, which includes the subject matter of any of Examples 32-40, the processing device may be caused to analyze an address of a page in which the malware is detected to determine a severity associated with the malware; and provide an indication of the malware detected within the page to a security routine executed by the first processor component or transmitting an indication of the malware detected within the page to a security server via the network based on the severity.

In Example 42, which includes the subject matter of any of Examples 32-41, the processing device may be caused to operate, by the graphics controller, a network interface of the processing device to disconnect the processing device from a network in response to detecting malware within a page.

In Example 43, at least one tangible machine-readable storage medium may include instructions that when executed by a processor component, cause the processor component to perform any of the above.

In Example 44, an apparatus may include means for performing any of the above.

The invention claimed is:

1. An apparatus, comprising:
   logic, at least a portion of which is implemented in circuitry, the logic to:
   generate entries in a first page modification log maintained within a first storage divided into multiple pages, each entry to indicate a write access made by a processor component to a page of the multiple pages;
   retrieve indications from the first page modification log of at least one recently written page of the multiple pages; and
   scan the at least one recently written page to detect malware within the at least one recently written page.

2. The apparatus of claim 1, the logic to support virtual addressing based on the multiple pages and to generate each entry within the first page modification log in response to a provision of an address translation for a write access to a page of the multiple pages.

3. The apparatus of claim 2, the logic to walk multiple layers of page tables maintained within the first storage to:
   translate addresses to support multiple virtual machines (VMs) generated by a host OS, and
   enable a guest OS that employs virtual addressing within one of the VMs to access at least a subset of the multiple pages associated with the one of the VMs by the host OS.

4. The apparatus of claim 3, the logic to:
   generate the entries within multiple page modification logs, each VM associated with at least one page modification log of the multiple page modification logs, the multiple page modification logs comprising the first page modification log; and
   retrieve indications from the multiple page modification logs of recently written pages.

5. The apparatus of claim 1, the first storage to store a security routine implemented by the logic to counteract malware, and the logic to provide an indication to the security routine of malware detected within a page.

6. The apparatus of claim 5, comprising a network interface to couple the logic to a network, the logic to:
   analyze an address of a page in which the malware is detected to determine a severity associated with the malware; and
   transmit an indication to a security server via the network of malware detected within a page in lieu of provision of the indication to the security routine based on the severity.

7. An apparatus, comprising:
   logic, at least a portion of which is implemented in circuitry, the logic to:
   generate entries in a first page modification log maintained within a first storage divided into multiple pages and coupled to a storage controller, each entry to indicate a write access made to a page of the multiple pages;
   retrieve indications from the first page modification log of at least one recently written page of the multiple pages; and
   scan the at least one recently written page to detect malware within the at least one recently written page.

8. The apparatus of claim 7, the first page modification log to accommodate a limited quantity of the entries and the logic to generate the entries within a second page modification log maintained within the first storage.

9. The apparatus of claim 8, the logic to:
rotate among at least the first and second page modification logs to generate the entries.

10. The apparatus of claim 8, the logic to:
rotate among at least the first and second page modification logs to retrieve indications of recently written pages.

11. The apparatus of claim 7, the logic to determine to retrieve indications from the first page modification log or scan the at least one recently written page to detect malware based on a current degree of use of processing resources by graphics operations.

12. The apparatus of claim 7, comprising a network interface to couple the logic to a network, the logic to:
operate the network interface to disconnect from the network in response to detection of malware within a page.

13. A computer-implemented method, comprising:
generating entries in a first page modification log maintained within a first storage divided into multiple pages, each entry to indicate a write access made by a processor component to a page of the multiple pages;
retrieving indications from the first page modification log of at least one recently written page of the multiple pages; and
scanning the at least one recently written page to detect malware within the at least one recently written page.

14. The computer-implemented method of claim 13, comprising:
providing address translations for accesses to pages of the multiple pages to support virtual addressing based on the multiple pages; and
generating each entry within the first page modification log in response to providing an address translation for a write access to a page of the multiple pages.

15. The computer-implemented method of claim 14, comprising:
generating multiple layers of page tables within the first storage; and
walking the multiple layers of page tables to:
translate addresses to support multiple virtual machines (VMs) generated by a host OS, and
enable a guest OS that employs virtual addressing within one of the VMs to access at least a subset of the multiple pages associated with the one of the VMs by the host OS.

16. The computer-implemented method of claim 15, comprising:
generating the entries within multiple page modification logs, each VM associated with at least one page modification log of the multiple page modification logs, the multiple page modification logs comprising the first page modification log; and
retrieving indications from the multiple page modification logs of recently written pages.

17. The computer-implemented method of claim 13, comprising:
analyzing an address of a page in which the malware is detected to determine a severity associated with the malware; and
providing an indication of the malware detected within the page to a security routine or transmitting an indication of the malware detected within the page to a security server via a network based on the severity.

18. The computer-implemented method of claim 13, comprising disconnecting the processor component from a network in response to detecting malware within a page.

19. At least one non-transitory machine-readable storage medium comprising instructions that when executed by a processing device, cause the processing device to:
generate entries in a first page modification log maintained within a first storage divided into multiple pages, each entry to indicate a write access made by a processor component to a page of the multiple pages;
retrieve indications from the first page modification log, of at least one recently written page of the multiple pages; and
scan the at least one recently written page to detect malware within the at least one recently written page.

20. The at least one non-transitory machine-readable storage medium of claim 19, the processing device caused to:
provide address translations for accesses to pages of the multiple pages to support virtual addressing based on the multiple pages; and
generate each entry within the first page modification log in response to providing an address translation for a write access to a page of the multiple pages.

21. The at least one non-transitory machine-readable storage medium of claim 20, the processing device caused to:
generate multiple layers of page tables within the first storage; and
walk the multiple layers of page tables to:
translate addresses to support multiple virtual machines (VMs) generated by a host OS, and
enable a guest OS that employs virtual addressing within one of the VMs to access at least a subset of the multiple pages associated with the one of the VMs by the host OS.

22. The at least one non-transitory machine-readable storage medium of claim 20, the first page modification log to accommodate a limited quantity of the entries, the processing device caused to generate the entries within a second page modification log maintained within the first storage to allow more time for retrieving indications of recently written pages from the entries within the first page modification log before the entries within the first page modification log are overwritten with new entries generated by the address translator.

23. The at least one non-transitory machine-readable storage medium of claim 22, the processing device caused to:
rotate among at least the first and second page modification logs to generate the entries; and
rotate among at least the first and second page modification logs to retrieve indications of recently written pages.

24. The at least one non-transitory machine-readable storage medium of claim 19, the processing device caused to selectively perform at least one of the retrieval of indications from the first page modification log of at least one recently written page of the multiple pages, or the scan of the at least one recently written page to detect malware within the at least one recently written page based on a current degree of use of processing resources by graphics operations.

25. The at least one non-transitory machine-readable storage medium of claim 24, the graphics operations comprising at least one of providing a user interface, rendering a three-dimensional object or decompressing a motion video.

* * * * *